(12) United States Patent
Liu

(10) Patent No.: US 11,853,098 B2
(45) Date of Patent: Dec. 26, 2023

(54) DETECTION CIRCUIT, TOUCH CONTROL PANEL, AND ELECTRONIC APPARATUS

(71) Applicant: Chipone Technology (Beijing) Co., LTD., Beijing (CN)

(72) Inventor: Cheng Liu, Beijing (CN)

(73) Assignee: Chipone Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 17/876,418

(22) Filed: Jul. 28, 2022

(65) Prior Publication Data

US 2022/0374128 A1 Nov. 24, 2022

Related U.S. Application Data

(63) Continuation of application No. PCT/CN2020/133632, filed on Dec. 3, 2020.

(30) Foreign Application Priority Data

Mar. 17, 2020 (CN) .......................... 202010187345.8

(51) Int. Cl.
*G06F 3/041* (2006.01)
(52) U.S. Cl.
CPC ...... *G06F 3/04166* (2019.05); *G06F 3/04164* (2019.05)
(58) Field of Classification Search
CPC .......................... G06F 3/04166; G06F 3/04164
See application file for complete search history.

(56) References Cited

U.S. PATENT DOCUMENTS

| 10,496,866 B2 | 12/2019 | Li |
| 2016/0018921 A1* | 1/2016 | Matlick ............... G06F 3/04162 345/174 |

(Continued)

FOREIGN PATENT DOCUMENTS

| CN | 104331202 | 2/2015 |
| CN | 104679372 | 6/2015 |

(Continued)

OTHER PUBLICATIONS

CN Office Action issued in Chinese Appln. No. 202010187345.8, dated Aug. 11, 2021, 14 pages (With English Translation).

(Continued)

*Primary Examiner* — Lisa S Landis
(74) *Attorney, Agent, or Firm* — Fish & Richardson P.C.

(57) ABSTRACT

The present disclosure relates to detection circuits, touch control panels and electronic apparatuses. The circuit includes: a charge amplifier including a first input terminal, a second input terminal and an output terminal; a feedback capacitor, both ends of which are electrically connected to the first input terminal and the output terminal respectively, wherein the feedback capacitor is in parallel connection with a first switch; and a sensor electrode electrically connected to the first input terminal. A first excitation signal is applied to a thin film transistor (TFT) in a touch control panel where the detection circuit is located. A second excitation signal is applied to the second input terminal, wherein the first excitation signal is in-phase with the second excitation signal. An amplitude of the first excitation signal is larger than an amplitude of the second excitation signal.

19 Claims, 3 Drawing Sheets

(56) References Cited

U.S. PATENT DOCUMENTS

| | | |
|---|---|---|
| 2016/0370948 A1 | 12/2016 | Lee et al. |
| 2017/0090615 A1 | 3/2017 | Bohannon et al. |
| 2019/0073061 A1* | 3/2019 | Krah .................. G02F 1/13338 |
| 2019/0204971 A1 | 7/2019 | Kang et al. |
| 2020/0081567 A1* | 3/2020 | Jiang .................... G06F 3/0446 |

FOREIGN PATENT DOCUMENTS

| | | |
|---|---|---|
| CN | 106293299 | 1/2017 |
| CN | 106446780 | 2/2017 |
| CN | 107291309 | 10/2017 |
| CN | 109471563 | 3/2019 |
| CN | 111309187 | 6/2020 |
| JP | 2015132506 | 7/2015 |
| JP | 2016-540302 | 12/2016 |
| JP | 2017-16560 | 1/2017 |
| JP | 2018-101412 | 6/2018 |
| JP | 2018-529136 | 10/2018 |
| WO | WO 2017003848 | 1/2017 |

OTHER PUBLICATIONS

CN Office Action issued in Chinese Appln. No. 202010187345.8, dated Nov. 9, 2021, 7 pages (With English Translation).

CN Office Action issued in Chinese Appln. No. 202010187345.8, dated Feb. 3, 2021, 13 pages (With English Translation).

PCT International Search Report in International Appln. No. PCT/CN2020/133632, dated Mar. 8, 2021, 7 pages (With English Translation).

Extended European Search Report in European Appln. No. 20925776.5, dated May 11, 2023, 8 pages.

Office Action in Japanese Appln. No. 2022-552924, dated Sep. 12, 2023, 7 pages (With English Translation).

\* cited by examiner

DETECTION CIRCUIT, TOUCH CONTROL PANEL, AND ELECTRONIC APPARATUS

CROSS-REFERENCE TO RELATED APPLICATION

This application is a continuation of and claims priority under 35 U.S.C. § 120 to PCT Application. No. PCT/CN2020/133632, filed on Dec. 3, 2020, which is based upon and claims priority of Chinese Patent Application entitled "Detection Circuit, Touch Control Panel, and Electronic Apparatus" filed on Mar. 17, 2020, with the Application No. 202010187345.8. All the above referenced priority documents are hereby incorporated by reference in their entireties.

TECHNICAL FIELD

The present disclosure relates to the technical field of electronics, in particular to a detection circuit, a touch control panel and an electronic apparatus.

BACKGROUND

Touch control panels (also known as touch screens), especially capacitive touch control panels, have been widely used in various user electronic apparatuses. One kind of the capacitive touch control panels relies on a detection circuit to sense a touch action—specifically, a VCOM (reference voltage) electrode on the touch control panel is divided into a plurality of sensor electrodes, i.e., sensor RX (RX is the abbreviated form of receive). As shown in FIG. 1, when the sensor RX (VCOM) is touched, an equivalent capacitance of the RX becomes larger, which increases an output voltage $V_{out}$ of the charge amplifier (CA). In this way, the touch action can be detected based on the change of the output voltage $V_{out}$.

However, the sensor electrodes have relatively large parasitic capacitances, including parasitic capacitances of wiring, which are mainly a parasitic capacitance $C_{base1}$ between the sensor electrodes and a source line and between the sensor electrodes and a gate line, and a parasitic capacitance to ground $C_{base2}$. These parasitic capacitances are often relatively large, which will lead to saturation of the output of the charge amplifier and consequently make it impossible to detect the touch action.

SUMMARY

The present disclosure provides a detection circuit, a touch control panel and an electronic apparatus so as to eliminate the influence of parasitic capacitances and avoid the defect that the touch action cannot be detected due to the saturation of the output of the charge amplifier.

An aspect of the present disclosure provides a detection circuit, comprising:

a charge amplifier comprising a first input terminal, a second input terminal, and an output terminal;

a feedback capacitor, both ends of which are electrically connected to the first input terminal and the output terminal respectively, wherein the feedback capacitor is in parallel connection with a first switch; and a sensor electrode electrically connected to the first input terminal;

wherein a first excitation signal is applied to a thin film transistor (TFT) in a touch control panel where the detection circuit is located, a second excitation signal is applied to the second input terminal, the first excitation signal being in-phase with the second excitation signal, and an amplitude of the first excitation signal being larger than that of the second excitation signal.

In a possible implementation, a difference between the amplitude of the first excitation signal and the amplitude of the second excitation signal is determined by the amplitude of the second excitation signal, a capacitance value of a first parasitic capacitance, a capacitance value of a second parasitic capacitance, and a capacitance value of the feedback capacitor, wherein the first parasitic capacitance is a parasitic capacitance generated between the sensor electrode and a source line of the TFT and between the sensor electrode and a gate line of the TFT, and the second parasitic capacitance is a parasitic capacitance to ground of the sensor electrode.

In a possible implementation, the amplitude of the first excitation signal and the amplitude of the second excitation signal satisfy a preset numerical relationship, which is expressed by the following formula:

$$\Delta V_{STIM\_HL} = \frac{(V_{STIML\_H} - V_{STIML\_L}) * C_{base2} + (V_{STIML\_H} - V_{OUT}) * C_{fb}}{C_{base1}},$$

where $\Delta V_{STIM\_HL}$ represents the difference between the amplitude of the first excitation signal and the amplitude of the second excitation signal;

$V_{STIML\_H}$ represents a high level value of the second excitation signal;

$V_{STIML\_L}$ represents a low level value of the second excitation signal;

$C_{base1}$ represents the capacitance value of the first parasitic capacitance;

$C_{base2}$ represents the capacitance value of the second parasitic capacitance; and $C_{fb}$ represents the capacitance value of the feedback capacitor.

In a possible implementation, in response to the sensor electrode being touched, an equivalent capacitance of the sensor electrode becomes larger, and a voltage of the output terminal becomes larger.

In a possible implementation, a second switch is connected in series between the sensor electrode and the first input terminal.

In a possible implementation, the first excitation signal and the second excitation signal are in-phase square signals with the same period.

In a possible implementation, the first input terminal is an inverting input terminal and the second input terminal is a non-inverting input terminal.

In a possible implementation, the touch control panel comprises a capacitive touch control panel.

Another aspect of the present disclosure provides a touch control panel comprising a capacitive touch control panel, wherein the touch control panel including the above circuit.

In a possible implementation, a common electrode of the touch control panel is divided into one or more of the sensor electrodes.

Another aspect of the present disclosure provides an electronic apparatus comprising the above circuit.

Based on the implementations of the aspects of the present disclosure, the first excitation signal VSTMH is set to be in-phase with the second excitation signal VSTML, and the amplitude of the first excitation signal VSTMH is larger than that of the second excitation signal VSTML.

Therefore, the influence of the parasitic capacitances on the accuracy of touch action detection can be reduced or even avoided, and the area of the detection circuit can be reduced since there is no need to add additional hardware, such that the area of the Touch IC integrated with the detection circuit can be reduced.

Other features and aspects of the present disclosure will become apparent from the following detailed description of exemplary embodiments with reference to the drawings.

BRIEF DESCRIPTION OF THE DRAWINGS

The drawings, which are incorporated into and constitute a part of the description, illustrate the exemplary embodiments, features and aspects of the present disclosure together with the description, and serve to explain the principle of the present disclosure.

DETAILED DESCRIPTION OF THE EMBODIMENTS

Figure 1:
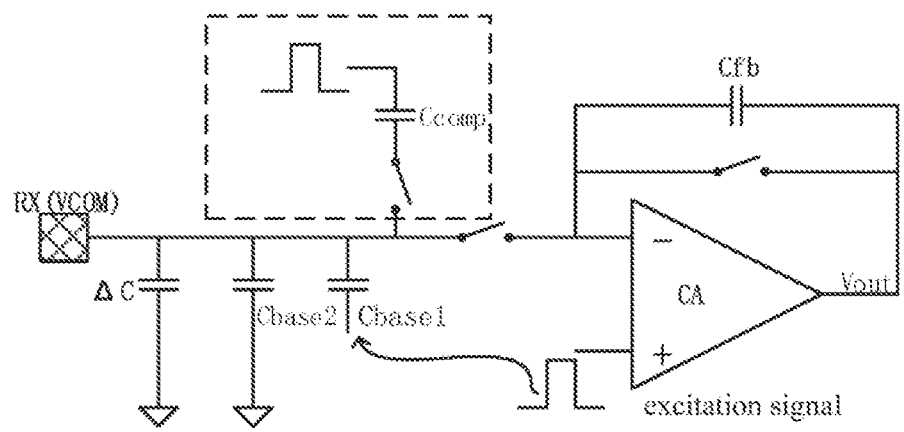
FIG. 1 shows an equivalent circuit diagram of a detection circuit.

Various exemplary embodiments, features and aspects of the present disclosure will be described in detail below with reference to the drawings. In the drawings, the same reference signs denote elements with the same or similar functions. Although various aspects of the embodiments are shown in the drawings, unless otherwise specified, the drawings are not necessarily drawn to scale.

The word "exemplary" used here means "serving as an example, embodiment or illustration". Any embodiment described here as "exemplary" is not necessarily to be interpreted as superior to or better than other embodiments.

Furthermore, for a better explanation of the present disclosure, numerous specific details are given in the following detailed description of the embodiments. Those skilled in the art should understand that the present disclosure may also be implemented without certain specific details. In some embodiments, methods, means, elements and circuits that are well known to those skilled in the art are not described in detail in order to highlight the main idea of the present disclosure.

The term "and/or" used herein is only for describing an association relationship between the associated objects, which means that there may be three relationships, for example, A and/or B may denote three situations: A exists alone, both A and B exist, and B exists alone. Furthermore, the character "/" used herein indicates a relationship of "or" between the associated objects before and after the character "/".

The term "a plurality of" in the embodiments of the present disclosure means two or more. The words "first", "second" and the like in the embodiments of the present disclosure are only used to illustrate and distinguish between the described objects, and do not indicate any sequence or any special restriction on the number in the embodiments of the present disclosure, and thus do not constitute any restriction on the embodiments of the present disclosure.

FIG. 1 shows an equivalent circuit diagram of a general detection circuit. The principle of the circuit shown in FIG. 1 implementing the touch detection is as follows: the sensor electrode RX (VCOM) is precharged once, and then connected to the input terminal of the charge amplifier through a control switch, so that the charge of the RX will be transferred to the output terminal of the charge amplifier; and because the precharged voltage is constant, when the capacitance of the RX changes, the obtained output voltage $V_{out}$ of the charge amplifier is different. When a finger touches the panel, the equivalent capacitance of the RX becomes larger, which increases the output voltage $V_{out}$ of the charge amplifier, that is, a variation of the output voltage of the charge amplifier is obtained by the following formula;

$$\Delta V = V_{stim} * \frac{\Delta C}{C_{fb}}, \qquad \text{Formula (1)}$$

where $\Delta V$ represents the variation of the output voltage; $V_{stim}$ represents the precharged voltage value; and $\Delta C$ represents the variation of the equivalent capacitance of the RX.

In this way, whether there is a touch can be detected based on the variation $\Delta V$ of the output voltage of the charge amplifier.

However, in actual detection, the sensor RX (sensor electrode) has relatively large parasitic capacitances, including parasitic capacitances of wiring, such as a parasitic capacitance $C_{base1}$ generated between the RX and a source line of each transistor in a thin film transistor (TFT) layer of a touch control panel and between the RX and a gate line of each transistor in the TFT layer of the touch control panel, and a parasitic capacitance to ground $C_{base2}$ of the RX. In FIG. 1, $C_{base1}$ represents the parasitic capacitance between the sensor and the source line and between the sensor and the gate line, and $C_{base2}$ represents the parasitic capacitance to ground of the RX.

As capacitance values of these parasitic capacitances are large (up to hundreds of pF), the output of the charge amplifier will be saturated. In order to make the charge amplifier work in a linear section, it is necessary to compensate the parasitic capacitances of the RX to eliminate the parasitic capacitances, so that the equivalent input capacitance seen by the charge amplifier is relatively small. In FIG. 1, the compensation method adopted is to apply an in-phase excitation signal to the parasitic capacitance $C_{base1}$ and the charge amplifier to eliminate the parasitic capacitance $C_{base1}$. For the elimination of the parasitic capacitance $C_{base2}$, a capacitance compensation circuit (as shown in the dotted box) is used. This capacitance compensation circuit precharges an internal capacitor Ccomp, and then introduces the precharged charge to the RX (VCOM) to eliminate the parasitic capacitance $C_{base2}$. By doing so, the detection circuit needs to occupy a larger chip area, or needs a chip with a larger area.

Figure 2:
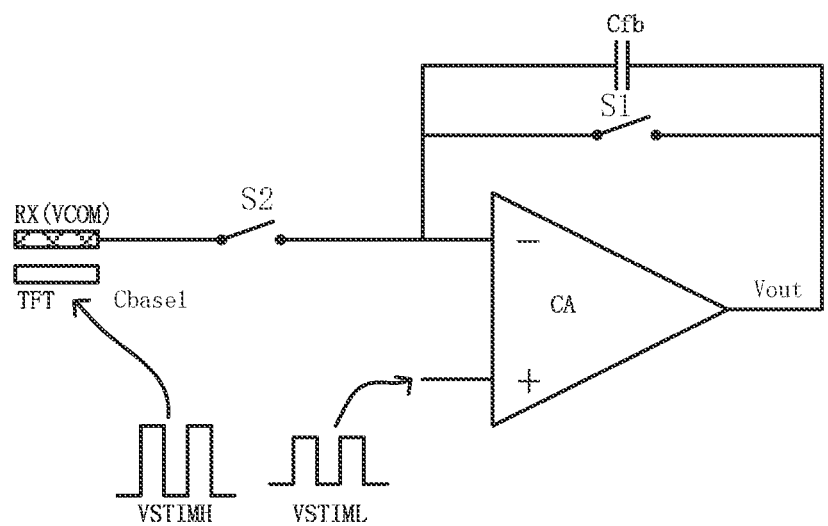
FIG. 2 shows a circuit diagram of a detection circuit provided by an embodiment of the present disclosure.

FIG. 2 shows a circuit diagram of a detection circuit provided by an embodiment of the present disclosure. Specifically, as shown in FIG. 2, the circuit may comprise:
 a charge amplifier CA including a first input terminal−, a second input terminal+, and an output terminal $V_{out}$;
 a feedback capacitor $C_{fb}$, both ends of which are electrically connected to the first input terminal− and the output terminal $V_{out}$ respectively, wherein the feedback capacitor $C_{fb}$ is in parallel connection with a first switch S1;
 a sensor electrode RX electrically connected to the first input terminal−, and a first excitation signal VSTMH is applied to a thin film transistor (TFT) in a touch control panel where the detection circuit is located (for example, a first excitation signal may be applied to a gate line of a TFT), a second excitation signal VSTML is applied to the second input terminal, the first excitation signal VSTMH being in-phase with the second excitation signal VSTML, and an amplitude of the first excitation signal VSTMH being larger than that of the second excitation signal VSTML.

The touch control panel may be a capacitive touch control panel.

By setting the first excitation signal VSTMH to be in-phase with the second excitation signal VSTML, and setting the amplitude of the first excitation signal VSTMH to be larger than that of the second excitation signal VSTML, the influence of the parasitic capacitances on the touch action detection can be reduced or eliminated. Furthermore, additional hardware is not needed, so the area of the detection circuit can be reduced, thereby reducing the area of the Touch IC where the detection circuit is located.

Figure 3:
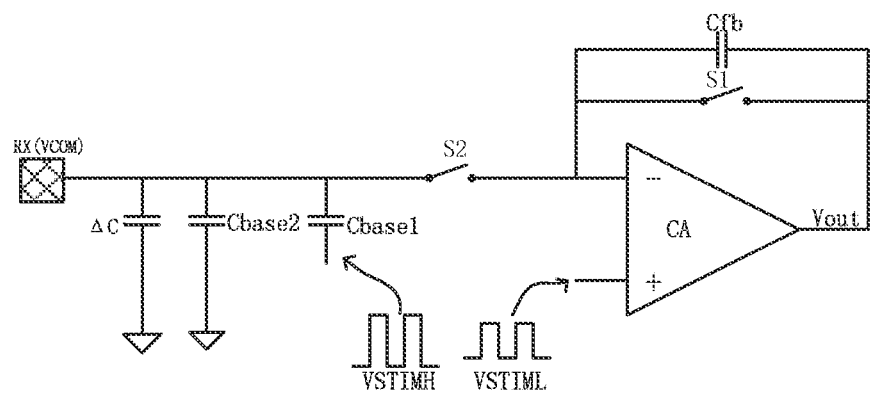
FIG. 3 shows an equivalent circuit diagram of a detection circuit provided by an embodiment of the present disclosure.

The difference between the amplitude of the first excitation signal and the amplitude of the second excitation signal can be selected as required, so as to meet the requirement of reducing or eliminating the influence of the parasitic capacitances on the touch action detection. Hence, the difference between the amplitude of the first excitation signal and the amplitude of the second excitation signal is not limited in the present disclosure. FIG. 3 is an equivalent circuit diagram of the detection circuit shown in FIG. 2 according to this embodiment. As shown in FIG. 3, in one embodiment of the present disclosure, the difference between the amplitude of the first excitation signal and the amplitude of the second excitation signal can be determined by the amplitude of the second excitation signal VSTML, the capacitance value of the first parasitic capacitance $C_{base1}$, the capacitance value of the second parasitic capacitance $C_{base2}$, and the capacitance value of the feedback capacitor $C_{fb}$. The first parasitic capacitance $C_{base1}$ is a parasitic capacitance generated between the sensor electrode RX and the source line of the TFT shown in FIG. 1 and between the sensor electrode RX and the gate line of the TFT shown in FIG. 1, and the second parasitic capacitance $C_{base2}$ is a parasitic capacitance to ground of the sensor electrode RX. AC represents a variable equivalent capacitance of the sensor electrode RX. Specifically, in response to the sensor electrode being touched, the equivalent capacitance of the sensor electrode becomes larger, resulting in an increase of the voltage $V_{out}$ at the output terminal.

In one embodiment of the present disclosure, the amplitude of the first excitation signal and the amplitude of the second excitation signal satisfy a preset numerical relationship, which is expressed by the following formula:

$$\Delta V_{STIM\_HL} = \frac{(V_{STIML\_H} - V_{STIML\_L}) * C_{base2} + (V_{STIML\_H} - V_{OUT}) * C_{fb}}{C_{base1}}$$

where $\Delta V_{STIM\_HL}$ represents the difference between the amplitude of the first excitation signal and the amplitude of the second excitation signal;
$V_{STIML\_H}$ represents a high level value of the second excitation signal;
$V_{STIML\_L}$ represents a low level value of the second excitation signal;

$C_{base1}$ represents the capacitance value of the first parasitic capacitance;
$C_{base2}$ represents the capacitance value of the second parasitic capacitance; and
$C_{fb}$ represents the capacitance value of the feedback capacitor.

The amplitude of the first excitation signal may refer to a difference between the high level value and the low level value of the first excitation signal, and the amplitude of the second excitation signal may refer to a difference between the high level value and the low level value of the second excitation signal.

In one embodiment of the present disclosure, a second switch S2 is connected in series between the sensor electrode RX and the first input terminal−. The second switch S2 can be used to reset the charge of the electrode RX, and when one touch action detection is completed, the second switch S2 can be turned off to charge the electrode RX for the next touch action detection.

In one embodiment of the present disclosure, the first excitation signal and the second excitation signal are in-phase square signals with the same period. The first excitation signal and the second excitation signal can also be in other forms, which is not limited by the present disclosure.

In one embodiment of the present disclosure, the first input terminal is an inverting input terminal and the second input terminal is a non-inverting input terminal.

With reference to the equivalent circuit diagram of the detection circuit shown in FIG. 3, the working principle by which the detection circuit eliminates the parasitic capacitances $C_{base1}$ and $C_{base2}$ is explained below:

Step 1: in a reset phase, the non-inverting input terminal of the charge amplifier is connected to the low potential of the VSTIML, the first switch S1 of the feedback capacitor $C_{fb}$ is turned on, the charge amplifier is in the form of a buffer, and a lower plate (i.e., TFT layer) of the equivalent capacitance $C_{base1}$ is connected to the low potential of the VSTIMH (the first excitation signal);

Step 2: in an integration phase, the switch S1 of the feedback capacitor $C_{fb}$ is turned off, and the voltage at the non-inverting terminal of the charge amplifier jumps from the low level to the high level of the VSTIML (the second excitation signal), and the excitation signal VSTMH applied to the $C_{base1}$ also jumps from the low level to the high level;

Step 3: in the reset phase, the non-inverting terminal of the charge amplifier is connected to the high potential of the VSTIML, the switch S1 of the $C_{fb}$ is turned on, the charge amplifier is in the form of a buffer, and the lower plate of the $C_{base1}$ is connected to the high potential of the VSTIMH; and Step 4: in the integration phase, the switch S1 of the feedback capacitor $C_{fb}$ is turned off, and the voltage at the non-inverting terminal of the charge amplifier jumps from the high level to the low level of the VSTIML, and the excitation signal VSTIMH applied to the $C_{base1}$ also jumps from the high level to the low level.

The above four steps can complete one touch action detection, and complete sampling and quantization of one complete excitation signal period.

The following explanation is made by taking the VSTIM (excitation signal) jumping from the low level to the high level (that is, from the above Step 1 to the above Step 2) as an example:

in the reset phase, the charge at the inverting terminal of the charger amplifier is expressed by the formula below:

$$V_{STIML\_L} * C_{base2} + (V_{STIML\_L} - V_{STIMH\_L}) * C_{base1} \quad \text{Formula (2),}$$

in the integration phase, the charge at the inverting terminal of the charger amplifier is expressed by the formula below:

$$V_{STIML\_H} * C_{base2} + (V_{STIML\_H} - V_{STIMH\_H}) * C_{base1} + (V_{STIML_H} - V_{OUT}) * C_{fb} \quad \text{Formula (3),}$$

according to the charge conservation, the Formula (2) is equal to the Formula (3), which gives:

$$V_{STIM\_L} * C_{base2} + (V_{STIML\_L} - V_{STIMH\_L}) * C_{base1} = V_{STIML\_H} * C_{base2} + (V_{STIML\_H} - V_{STIMH\_H}) * C_{base1} + (V_{STIML\_H} - V_{OUT}) * C_{fb} \quad \text{Formula (4),}$$

the amplitude difference between the two excitation signals VSTIM is obtained by the following formula:

$$\Delta V_{STIM\_HL} = (V_{STIMH\_H} - V_{STIMH\_L}) - (V_{STIML\_H} - V_{STIML\_L})$$

and then, the following Formula 5 can be obtained from the Formula (4):

$$\Delta V_{STIM\_HL} = \frac{(V_{STIML\_H} - V_{STIML\_L}) * C_{base2} + (V_{STIML\_H} - V_{OUT}) * C_{fb}}{C_{base1}} \quad \text{Formula (5)}$$

that is, as long as the difference between the amplitude of the first excitation signal applied to the $C_{base1}$ and the amplitude of the signal applied to the charge amplifier keeps satisfying the numerical relationship of the Formula (5), the redundant parasitic capacitances can be eliminated. For example, if $V_{out}=(VSTIML+VSTIMH)/2$, according to the charge conservation, the Formula (2) is equal to the Formula (3), which gives:

$$(V_{STIMH} - V_{STIML}) * C_{base1} = V_{STIML} * C_{base2} + \frac{V_{STIML}}{2} * C_{fb}, \quad \text{Formula (6)}$$

and a difference between the VSTIMH and the VSTIML is obtained by the following formula:

$$\Delta V = (V_{STIMH} - V_{STIML}) = \frac{V_{STIML}}{C_{base1}}\left(C_{base2} + \frac{C_{fb}}{2}\right), \quad \text{Formula (7)}$$

that is, under such circumstances, as long as the amplitude of the first excitation signal and the amplitude of the second excitation signal satisfy the relationship of the Formula (7), the influence of the parasitic capacitances can be eliminated.

In addition, while effectively eliminating the parasitic capacitances, compared with the parasitic capacitance elimination method shown in FIG. 1, the method shown in FIG. 2 and FIG. 3 can also effectively reduce the chip area occupied by the detection circuit, thus reducing the area of the chip. The detection circuit shown in FIG. 1 serves as a touch section in an integrated-touch-driver (ITD) chip, and the area of the compensation capacitor and the compensation circuit accounts for about 30% of the area of the chip. According to the embodiments of FIG. 2 and FIG. 3, the area of the chip can be reduced by 30%.

According to the implementation of the detection circuit provided by the above embodiment, the first parasitic capacitance $C_{base1}$ and the second parasitic capacitance $C_{base2}$ can be eliminated by applying the first excitation signal and the second excitation signal and making the two excitation signals satisfy the above preset numerical relationship, thereby avoiding the influence of the parasitic capacitances on the accuracy of the touch action detection. While avoiding the influence of the parasitic capacitances on the accuracy of the touch action detection, the above detection circuit does not need additional hardware, which can effectively reduce the area of the detection circuit, and further save the area of the Touch IC integrated with the detection circuit.

Based on a detection circuit described in the above embodiments, the present disclosure also provides a touch panel, which comprises a capacitive touch panel including the detection circuit.

In an embodiment of the present disclosure, a common electrode VCOM of the touch control panel can be divided into one or more of the sensor electrodes RX.

Figure 4:
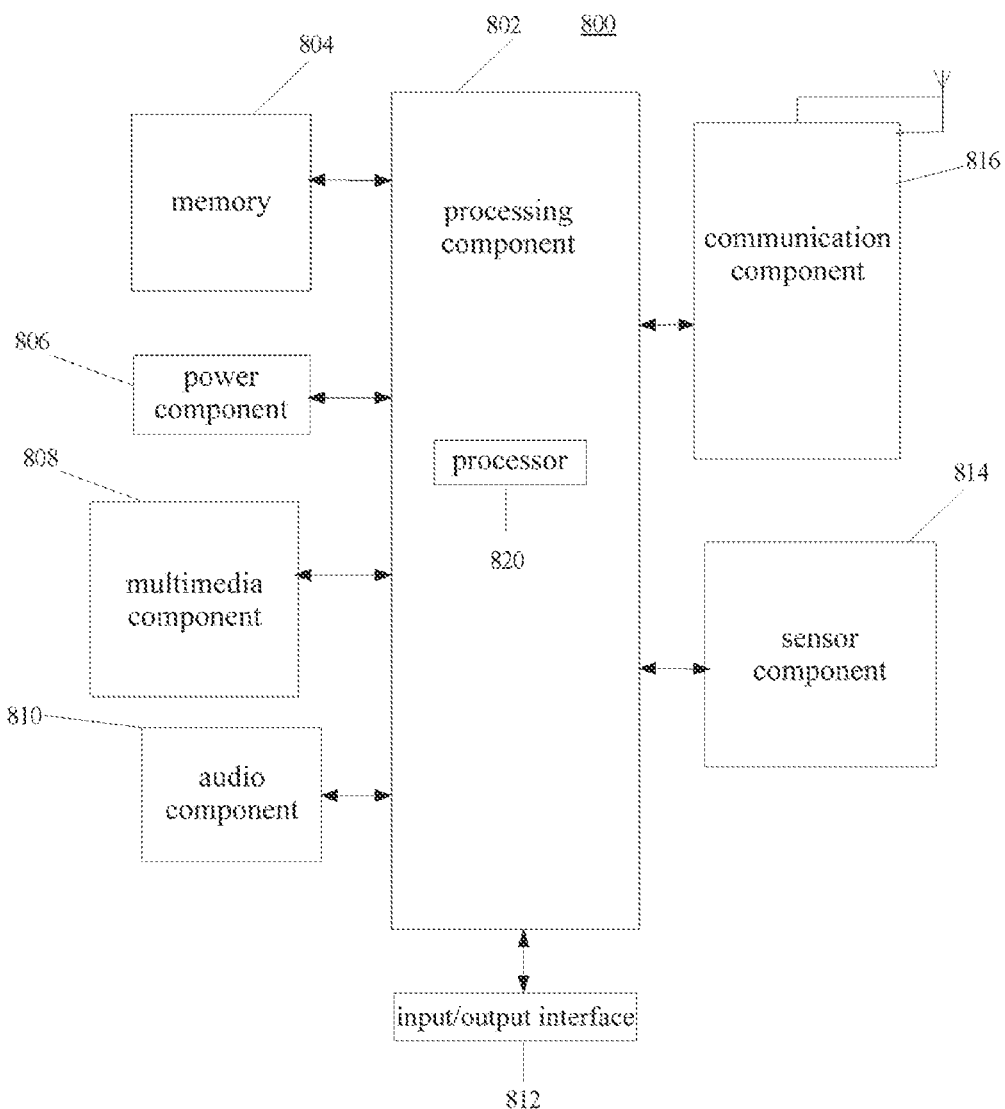
FIG. 4 is a block diagram of an electronic apparatus according to an exemplary embodiment.

FIG. 4 shows a block diagram of an electronic apparatus 800 comprising the above touch control panel according to an exemplary embodiment. The electronic apparatus 800 may comprise the above touch control panel. The electronic apparatus 800 may be a mobile phone, a computer, a digital broadcast electronic apparatus, a message transceiver, a game console, a tablet device, medical equipment, fitness equipment, a Personal Digital Assistant (PDA), or the like.

Referring to FIG. 4, the electronic apparatus 800 may comprise one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the electronic apparatus 800, such as operations related to display, phone call, data communication, camera operation, and record operation. The processing component 802 may comprise one or more processors 820 to execute instructions. Furthermore, the processing component 802 may comprise one or more modules for facilitating interaction between the processing component 802 and other components. For example, the processing component 802 may comprise a multimedia module to facilitate the interaction between the multimedia component 808 and the processing component 802.

The memory 804 is configured to store various types of data to support the operations of the electronic apparatus 800. Examples of these data include instructions for any application or method operated on the electronic apparatus 800, contact data, telephone directory data, messages, pictures, videos, etc. The memory 804 may be implemented by any type of volatile or non-volatile storage apparatuses or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 806 supplies electric power to various components of the electronic apparatus 800. The power supply component 806 may comprise a power supply management system, one or more power supplies, and other components related to the generation, management, and allocation of power for the electronic apparatus 800.

The multimedia component 808 comprises a screen providing an output interface between the electronic apparatus 800 and a user. In some embodiments, the screen may comprise a Liquid Crystal Display (LCD) and a Touch Panel (TP). If the screen comprises the touch panel, the screen may be implemented as a touch control panel to receive an input signal from the user. The touch panel comprises one or more touch sensors to sense the touch, sliding and gestures on the touch panel. The touch sensor may not only sense a boundary of the touch or sliding operation, but also detect the duration and pressure related to the touch or sliding operation. In some embodiments, the multimedia component 808 comprises a front camera and/or a rear camera. When the electronic apparatus 800 is in an operating mode such as a shooting mode or a video mode, the front camera and/or the rear camera may receive external multimedia data. Each front camera and rear camera may be a fixed optical lens system or have a focal length and optical zooming capacity.

The audio component 810 is configured to output and/or input an audio signal. For example, the audio component 810 comprises a microphone (MIC). When the electronic apparatus 800 is in the operating mode such as a call mode, a record mode and a voice identifying mode, the microphone is configured to receive an external audio signal. The received audio signal may be further stored in the memory 804 or sent by the communication component 816. In some embodiments, the audio component 810 also comprises a loudspeaker which is configured to output the audio signal.

The I/O interface 812 provides an interface between the processing component 802 and a peripheral interface module. The peripheral interface module may be a keyboard, a click wheel, buttons, etc. These buttons may include, but are not limited to: a home button, a volume button, a start button, and a lock button.

The sensor component 814 comprises one or more sensors which are configured to provide state evaluation in various aspects for the electronic apparatus 800. For example, the sensor component 814 may detect an on/off state of the electronic apparatus 800 and relative positions of the components such as a display and a keypad of the electronic apparatus 800. The sensor component 814 may also detect the position change of the electronic apparatus 800 or a component of the electronic apparatus 800, presence or absence of a user contact with the electronic apparatus 800, directions or acceleration/deceleration of the electronic apparatus 800 and the temperature change of the electronic apparatus 800. The sensor component 814 may include a proximity sensor configured to detect the presence of nearby objects without physical contact. The sensor component 814 may further comprise an optical sensor, such as a Complementary Metal Oxide Semiconductor (CMOS) or Charge Coupled Device (CCD) image sensor, for use in the imaging application. In some embodiments, the sensor component 814 may further comprise an acceleration sensor, a gyroscope sensor, a magnetic sensor, a pressure sensor or a temperature sensor.

The communication component 816 is configured to facilitate the communication in a wired or wireless mode between the electronic apparatus 800 and other apparatuses. The electronic apparatus 800 may access a wireless network based on communication standards, such as wireless fidelity (Wi-Fi), a $2^{nd}$ generation mobile communication technology (2G), a $3^{rd}$ generation mobile communication technology (3G), or a combination thereof. In an exemplary embodiment, the communication component 816 receives a broadcast signal or broadcast related information from an external broadcast management system via a broadcast channel. In an exemplary embodiment, the communication component 816 further comprises a Near Field Communication (NFC) module to promote the short range communication. For example, the NFC module may be implemented on the basis of a Radio Frequency Identification (RFID) technology, an Infrared Data Association (IrDA) technology, an Ultra Wide Band (UWB) technology, a Bluetooth (BT) technology and other technologies.

In an exemplary embodiment, the electronic apparatus 800 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components.

Aspects of the present disclosure have been described herein with reference to the flowchart and/or the block diagrams of the method and device (systems) according to the embodiments of the present disclosure. It will be appreciated that each block in the flowchart and/or the block diagram, and combinations of blocks in the flowchart and/or block diagram, can be implemented by the computer-readable program instructions.

These computer-readable program instructions may be provided to a processor of a general purpose computer, a dedicated computer, or other programmable data processing devices, to form a machine, such that when the instructions are executed by the processor of the computer or other programmable data processing devices, a device which implements the functions/actions specified in one or more blocks in the flowchart and/or block diagram is generated. These computer-readable program instructions may also be stored in a computer-readable storage medium, and the instructions cause the computer, programmable data processing device and/or other devices to function in a particular manner, such that the computer-readable storage medium having instructions stored thereon comprises a product that includes instructions implementing aspects of the functions/actions specified in one or more blocks in the flowchart and/or block diagram.

The computer-readable program instructions may also be loaded into a computer, other programmable data processing devices, or other devices to cause a series of operational operations to be executed on the computer, other programmable devices or other devices, so as to produce a computer implemented process, such that the instructions executed on the computer, other programmable devices or other devices implement the functions/actions specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a module, a program segment, or a part of an instruction, and the module, program segment, or part of an instruction comprises one or more executable instructions for implementing the specified logical function(s). In some alternative implementations, the functions denoted in the blocks may occur in an order different from that denoted in the drawings. For example, two consecutive blocks may, in fact, be executed substantially in parallel, or sometimes they may be executed in a reverse order, depending upon the functions involved. It should also be noted that each block in the block diagram and/or flowchart, and combinations of blocks in the block diagram and/or flowchart, can be implemented by dedicated hardware-based systems performing the specified functions or actions, or by combinations of dedicated hardware and computer instructions.

Although the embodiments of the present disclosure have been described above, it will be appreciated that the above descriptions are merely exemplary but not exhaustive, and that the disclosed embodiments are not limiting. A number of variations and modifications, without departing from the scopes and spirits of the described embodiments, are apparent to those skilled in the art. The terms in the present disclosure are selected to provide the best explanation on the principles and practical applications of the embodiments and the technical improvements to the arts on market, or to make the embodiments described herein understandable to those skilled in the art.

What is claimed is:

1. A detection circuit, comprising:
   a charge amplifier comprising a first input terminal, a second input terminal, and an output terminal;
   a feedback capacitor, both ends of which are electrically connected to the first input terminal and the output terminal respectively, the feedback capacitor being in parallel connection with a first switch; and
   a sensor electrode electrically connected to the first input terminal, wherein:
   a first excitation signal is applied to a thin film transistor in a touch control panel where the detection circuit is located,
   a second excitation signal is applied to the second input terminal, the first excitation signal being in-phase with the second excitation signal, and
   an amplitude of the first excitation signal is larger than an amplitude of the second excitation signal, wherein a difference between the amplitude of the first excitation signal and the amplitude of the second excitation signal is determined by the amplitude of the second excitation signal, a capacitance value of a first parasitic capacitance, a capacitance value of a second parasitic capacitance, and a capacitance value of the feedback capacitor, wherein the first parasitic capacitance is a parasitic capacitance generated between the sensor electrode and a source line of the thin film transistor and between the sensor electrode and a gate line of the thin film transistor, and the second parasitic capacitance is a parasitic capacitance to ground of the sensor electrode.

2. The detection circuit according to claim 1, wherein the amplitude of the first excitation signal and the amplitude of the second excitation signal satisfy a preset numerical relationship, which is expressed by the following formula:

$$\Delta V_{STIM\_HL} = \frac{(V_{STIML\_H} - V_{STIML\_L}) * C_{base2} + (V_{STIML\_H} - V_{OUT}) * C_{fb}}{C_{base1}},$$

where $\Delta V_{STIM\_HL}$ represents the difference between the amplitude of the first excitation signal and the amplitude of the second excitation signal;

$V_{STIML\_H}$ represents a high level value of the second excitation signal;

$V_{STIML\_L}$ represents a low level value of the second excitation signal;

$C_{base1}$ represents the capacitance value of the first parasitic capacitance;

$C_{base2}$ represents the capacitance value of the second parasitic capacitance; and $C_{fb}$ represents the capacitance value of the feedback capacitor.

3. The detection circuit according to claim 1, wherein in response to the sensor electrode being touched, an equivalent capacitance of the sensor electrode increases, and a voltage of the output terminal increases.

4. The detection circuit according to claim 1, wherein a second switch is connected in series between the sensor electrode and the first input terminal.

5. The detection circuit according to claim 1, wherein the first excitation signal and the second excitation signal are in-phase square signals with a same period.

6. The detection circuit according to claim 1, wherein the first input terminal is an inverting input terminal and the second input terminal is a non-inverting input terminal.

7. The detection circuit according to claim 1, wherein the touch control panel comprises a capacitive touch control panel.

8. A touch control panel, comprising a capacitive touch panel, which comprises a detection circuit comprising:
   a charge amplifier comprising a first input terminal, a second input terminal, and an output terminal;
   a feedback capacitor, both ends of which are electrically connected to the first input terminal and the output terminal respectively, the feedback capacitor being in parallel connection with a first switch; and
   a sensor electrode electrically connected to the first input terminal, wherein:
   a first excitation signal is applied to a thin film transistor in the touch control panel where the detection circuit is located,
   a second excitation signal is applied to the second input terminal, the first excitation signal being in-phase with the second excitation signal, and
   an amplitude of the first excitation signal is larger than an amplitude of the second excitation signal, wherein a difference between the amplitude of the first excitation signal and the amplitude of the second excitation signal is determined by the amplitude of the second excitation signal, a capacitance value of a first parasitic capacitance, a capacitance value of a second parasitic capacitance, and a capacitance value of the feedback capacitor, wherein the first parasitic capacitance is a parasitic capacitance generated between the sensor electrode and a source line of the thin film transistor and between the sensor electrode and a gate line of the thin film transistor, and the second parasitic capacitance is a parasitic capacitance to ground of the sensor electrode.

9. The touch control panel according to claim 8, wherein a common electrode of the touch control panel is divided into one or more of the sensor electrode.

10. An electronic apparatus, comprising a detection circuit, which comprises:
    a charge amplifier comprising a first input terminal, a second input terminal, and an output terminal;
    a feedback capacitor, both ends of which are electrically connected to the first input terminal and the output terminal respectively, the feedback capacitor being in parallel connection with a first switch; and
    a sensor electrode electrically connected to the first input terminal, wherein:
    a first excitation signal is applied to a thin film transistor in a touch control panel where the detection circuit is located, a second excitation signal is applied to the second input terminal, the first excitation signal being in-phase with the second excitation signal, and an amplitude of the first excitation signal is larger than an amplitude of the second excitation signal, wherein a difference between the amplitude of the first excitation signal and the amplitude of the second excitation signal is determined by the amplitude of the second excitation signal, a capacitance value of a first parasitic capacitance, a capacitance value of a second parasitic capacitance, and a capacitance value of the feedback capacitor, wherein the first parasitic capacitance is a parasitic capacitance generated between the sensor electrode and a source line of the thin film transistor and between the sensor electrode and a gate line of the thin film transistor, and the second parasitic capacitance is a parasitic capacitance to ground of the sensor electrode.

11. The touch control panel according to claim 8, wherein the amplitude of the first excitation signal and the amplitude of the second excitation signal satisfy a preset numerical relationship, which is expressed by the following formula:

$$\Delta V_{STIM\_HL} = \frac{(V_{STIML\_H} - V_{STIML\_L}) * C_{base2} + (V_{STIML\_H} - V_{OUT}) * C_{fb}}{C_{base1}},$$

where $\Delta V_{STIM\_HL}$ represents the difference between the amplitude of the first excitation signal and the amplitude of the second excitation signal;

$V_{STIML\_H}$ represents a high level value of the second excitation signal;

$V_{STIML\_L}$ represents a low level value of the second excitation signal;

$C_{base1}$ represents the capacitance value of the first parasitic capacitance;

$C_{base2}$ represents the capacitance value of the second parasitic capacitance; and $C_{fb}$ represents the capacitance value of the feedback capacitor.

12. The touch control panel according to claim 8, wherein a second switch is connected in series between the sensor electrode and the first input terminal.

13. The touch control panel according to claim 8, wherein the first excitation signal and the second excitation signal are in-phase square signals with a same period.

14. The touch control panel according to claim 8, wherein the touch control panel comprises a capacitive touch control panel.

15. The electronic apparatus according to claim 10, wherein the amplitude of the first excitation signal and the amplitude of the second excitation signal satisfy a preset numerical relationship, which is expressed by the following formula:

$$\Delta V_{STIM\_HL} = \frac{(V_{STIML\_H} - V_{STIML\_L}) * C_{base2} + (V_{STIML\_H} - V_{OUT}) * C_{fb}}{C_{base1}},$$

where $\Delta V_{STIM\_HL}$ represents the difference between the amplitude of the first excitation signal and the amplitude of the second excitation signal;

$V_{STIML\_H}$ represents a high level value of the second excitation signal;

$V_{STIML\_L}$ represents a low level value of the second excitation signal;

$C_{base1}$ represents the capacitance value of the first parasitic capacitance;

$C_{base2}$ represents the capacitance value of the second parasitic capacitance; and $C_{fb}$ represents the capacitance value of the feedback capacitor.

16. The detection circuit according to claim 1, wherein a second switch is connected in series between the sensor electrode and the first input terminal.

17. The detection circuit according to claim 1, wherein the first excitation signal and the second excitation signal are in-phase square signals with a same period.

18. The detection circuit according to claim 1, wherein the first input terminal is an inverting input terminal and the second input terminal is a non-inverting input terminal.

19. The detection circuit according to claim 1, wherein the touch control panel comprises a capacitive touch control panel.

* * * * *